United States Patent [19]

Zacker

[11] Patent Number: 4,971,019

[45] Date of Patent: Nov. 20, 1990

[54] SHAFT RELEASE SPEAR GUN

[76] Inventor: Mike Zacker, 2727 De Anza Rd., E-12, San Diego, Calif. 92109

[21] Appl. No.: 325,964

[22] Filed: Mar. 20, 1989

[51] Int. Cl.$^5$ .................................................. F41B 7/06
[52] U.S. Cl. ....................................... 124/22; 124/31; 124/40
[58] Field of Search ........................ 124/22, 25, 31, 40

[56] References Cited

U.S. PATENT DOCUMENTS

| 3,949,731 | 4/1976 | Caso | 124/31 |
| 3,963,017 | 6/1976 | Pfotenhauer | 124/40 |

FOREIGN PATENT DOCUMENTS

| 142092 | 4/1950 | Australia | 124/22 |
| 888345 | 12/1943 | France | 124/22 |
| 53246 | 10/1945 | France | 124/22 |
| 504997 | 5/1939 | United Kingdom | 124/25 |

*Primary Examiner*—Randolph A. Reese
*Assistant Examiner*—Jeffrey L. Thompson
*Attorney, Agent, or Firm*—S. Berg

[57] ABSTRACT

A spear gun assembly for propelling a sharpened spear in an underwater hunting environment. The assembly includes a holding bar rigidly attached to the gun which engages a hole in the spear. A trigger assembly is actuatable to pivot a lifter for lifting the spear from the holding bar, thereby releasing the spear from the gun. The trigger assembly is provided with a safety mechanism for preventing the lifter from pivoting and a lanyard which is disengaged as the trigger is actuated.

2 Claims, 1 Drawing Sheet

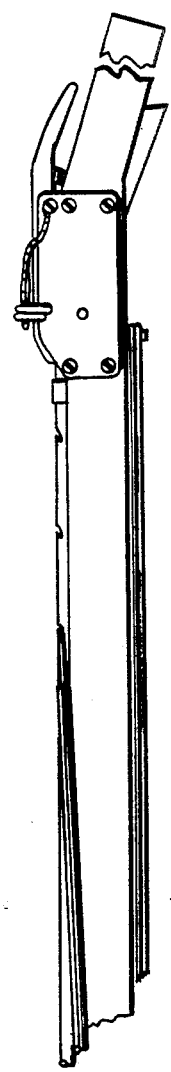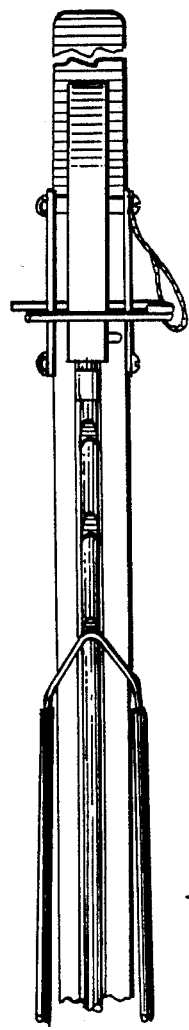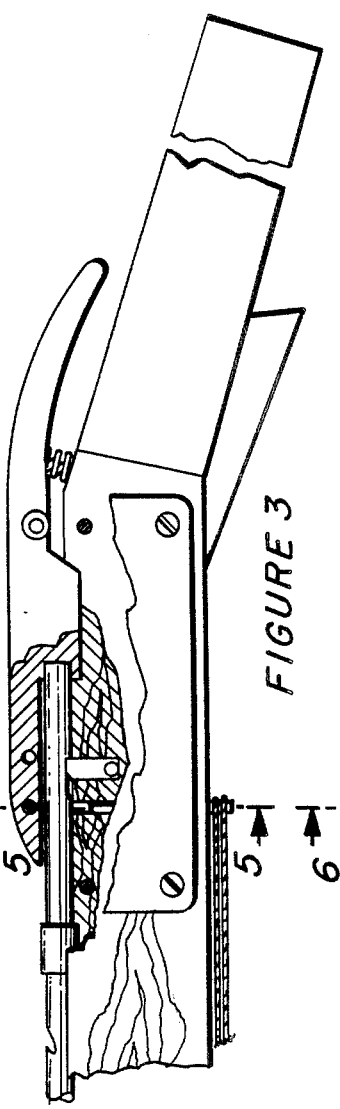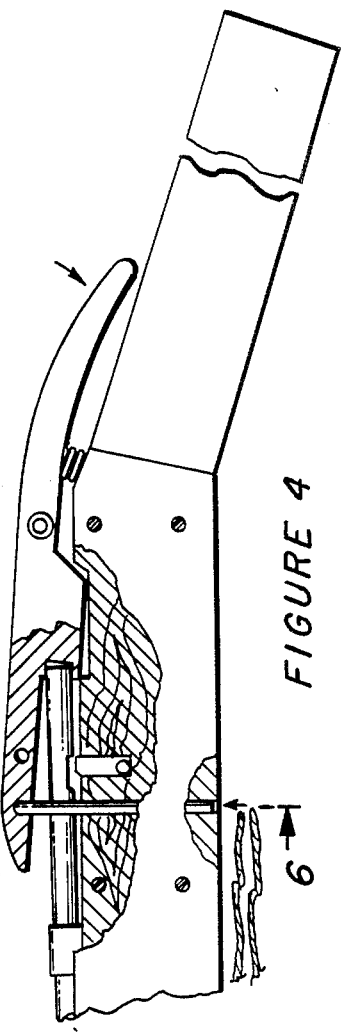
FIGURE 1
FIGURE 2
FIGURE 3
FIGURE 4
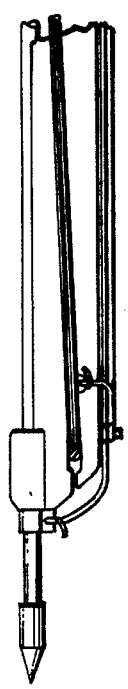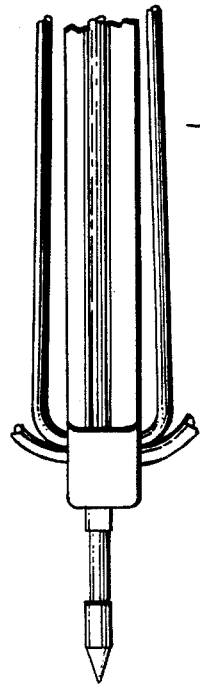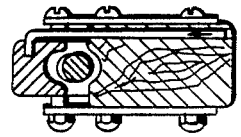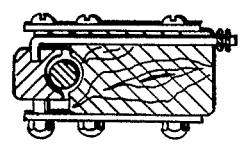
FIGURE 6
FIGURE 5

SHAFT RELEASE SPEAR GUN

BACKGROUND OF INVENTION

Scuba and snorkeling is made even more enjoyable when coupled with the sport of spear fishing. Hunting fish by spear has been used by many ancient tribal civilizations. The hunter is generally out of the water and manually drives his spear into the water towards the target with the objective of driving the spear into the target. This can be done rather easily because there is negligible resistance of air to the motion of a rapidly moving arm and the hunter has a firm foothold on some immovable object such as a rock or an anchored boat. If one attempts to perform the same activity while swimming or floating in the water he will soon discover he can not move the spear fast enough or with enough power or accuracy to impale a fish in its own environment.

To accomplish the objective of storing energy in a streamline mechanism, the spear gun has been invented and has been in use for some time. Trigger mechanism concepts have been adopted for more sophisticated mechanisms in as much as trigger mechanisms have been available for some years now. These trigger mechanisms tend to clog and corrode because of the salt water environment. Also such corrosion may deteriorate the safety feature required of all trigger mechanisms capable of releasing a lethal projectile. The inventor, an underwater sportsman with many years experience, has designed a trigger mechanism based on simplicity and effectiveness. The standard spear gun holds a spear in a groove where said groove cradles and directs the spear shaft. The gun generally uses an elastic material which is mounted on the front of the spear gun and is stretched to engage a groove near the rear of the spear. This stretched elastic component provides potential energy for launching the spear towards its target. The spear is locked on a bar which is mounted in the gun. This bar engages an elongated slot near the end of the shaft of the spear. The spear is released by lifting the end of the spear shaft over the bar by any of several means. The necessary safety locking mechanism is achieved by pinning the lifter to prevent the movement required to lift the shaft from the bar.

BRIEF DESCRIPTION OF DRAWINGS

FIG. 1. Side view of gun.
FIG. 2. Plan view of gun.
FIG. 3. Cocked trigger mechanism.
FIG. 4. Released trigger mechanism.
FIG. 5. Section view along line 5—5 of FIG. 3.
FIG. 6. Section view along line 6—6 of FIG. 4.

DETAILED DESCRIPTION OF EMBODIMENT

The following mechanism describes the system whereby a spear end is lifted free of a holding bar so that the spear may be catapulted along a spear grove in a gun towards a target. The catapult mechanism is an elastic band appropriately designed to be tensioned to contain adequate potential energy for propelling the spear forward.

A catapulting band engages a slot in the spear shaft (1). At the spear end (6) there is an elongated hole (5). A holding bar (4) is permanently mounted and attached to the gun. Said elongated hole (5) slips over said holding bar (4) and is engaged in the elongated hole by the downward tension component of the catapulting band engaging the spear. The aforementioned system of the catapulting band under tension and the holding bar (4) engaging the elongated hole (5) in the spear end (6) establishes a stable system with potential energy which remains ready to catapult the spear along the spear grove (2) at some target. A lifter (8) which is held in place by a pivot (7) makes contact with the spear end (6). A lift action (10) occurs when the depressor (11) is actuated. The depressor is an extension of the lifter beyond the pivot; when the depressor is pushed down say by a thumb action, in a see-saw fashion, the lifter rises. This action is illustrated in FIGS. 3 and 4. In FIG. 3, pressing downward at the extreme end of the lifter (8) at the depressor (11) location causes a release of the spear. A release mechanism actuated by a finger pull is also possible wherein a finger grasp acting through an eccentric mechanism may be used to translate a pulling action on said trigger grasp to raise the lifter. This obvious modification is not illustrated. Any means of lifting the lifter (8) or depressing the depressor (11) will cause the spear (1) to be freed from the holding bar (4). There is also a lanyard pin (3) which works in conjunction with the lifter. A lanyard connects the body of the gun to the spear. This lanyard is dressed around the lanyard pin (3) and when the lifter (8) rises the lanyard pin moves upward, withdrawing the end of the lanyard pin from the dressed lanyard. A small grommet may be slipped over the lowered tip of the lanyard pin to help contain the dressed lanyard. The grommet will slip off the bottom tip of the lanyard pin as the pin raises into the stock of the gun.

A safety mechanism to prevent motion of the lifter uses a pin to lock the safety-pin hole (9) which goes through the lifter (8) as well as the outside plates (13) which mount on the stock of the gun holding the lifter (8) at the pivot (7). The pin inserted through the safety-pin hole (9) and associated holes in the plates, restricts said lifter (8) from pivoting preventing an accidental release of the spear.

The above embodiments do not preclude other modifications of the basic mechanism which releases the spear by lifting the distal end of a spear from a holding bar as contrasted with many mechanisms which directly engage the catapulting band or other complex mechanisms which moves mechnical components from a stationary spear. The basic principal of this system is that the release of the spear is accomplished by moving the distal end of the spear perpendicular to its trajectory. The simplicity of the system makes it jam proof.

I claim:

1. A spear gun and a spear, said spear provided with a distal end having a sharpened point and a near end, said gun comprising
   a spear groove in which said spear rests,
   an elastic band on said gun for catapulting said spear along said spear groove,
   a lanyard connecting said spear to said gun,
   an elongated hole on said spear near end and on said gun,
   a pair of plates attached to said gun sides,
   a lifter which pivots between said plates on a bearing,
   a holding bar rigidly attached to said gun and which engages said elongated hole in said spear distal end,
   a trigger means connected to said lifter,
   a lanyard pin which is attached to said lifter and extends downward through said gun to hold loops of said lanyard, and a safety means which selectively prevents the lifter from pivoting, so that when the safety means is inactivated and the trigger means is actuated, the lifter pivots upward on its bearing simultaneously pulling the lanyard pin from the lanyard and lifting said spear near end off from said holding bar permitting said tensioned elastic band to catapult said spear along said spear groove unreeling said lanyard which had been released from said lanyard pin.

2. A spear gun having a trigger means, as described in claim 1, comprising an extension of said lifter extending beyond said pivot wherein said trigger means may be actuated by depressing said extension resulting in raising said lifter and removing said spear near end from said holding bar.

* * * * *